Figure 1:
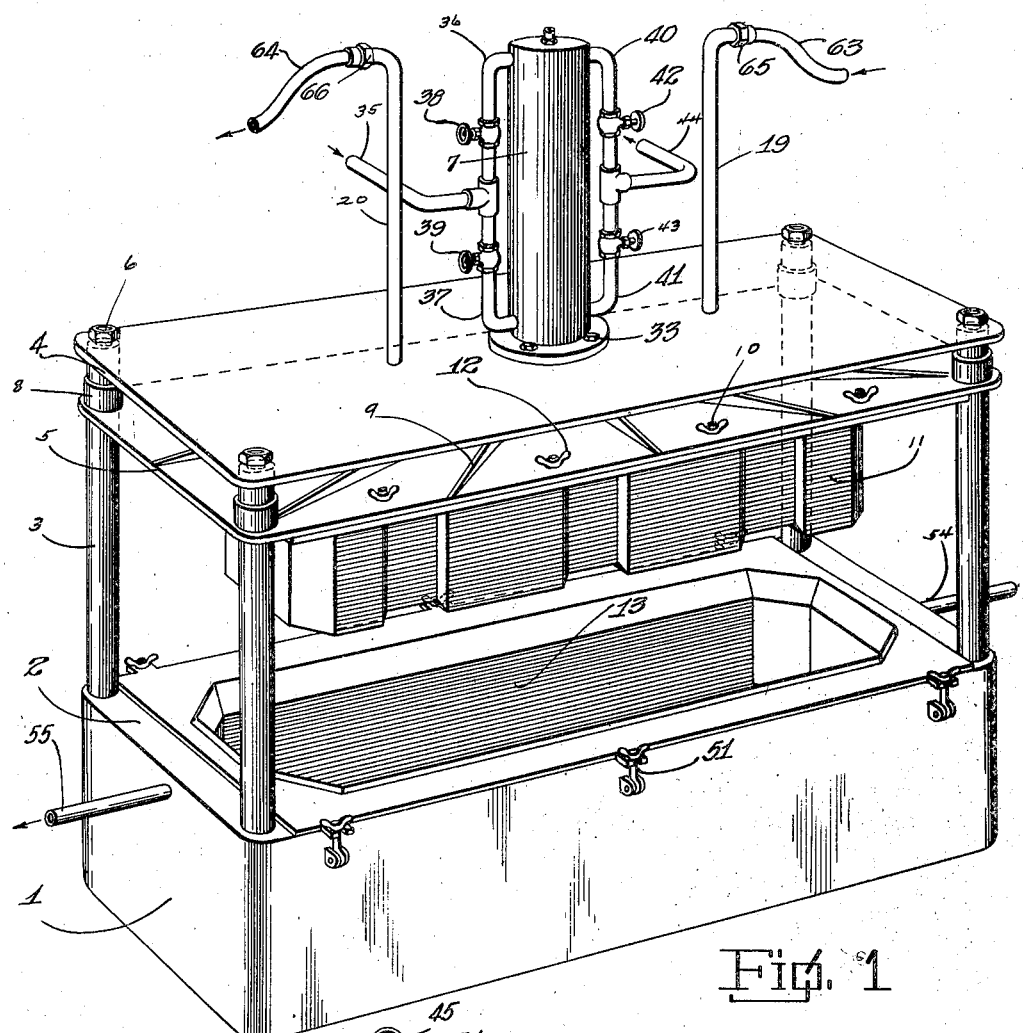

Dec. 28, 1937.   E. M. LEWIS   2,103,951
APPARATUS FOR MAKING BURIAL COFFINS
Filed March 2, 1936   3 Sheets-Sheet 1

INVENTOR
*Everett M. Lewis*
BY
*Victor J. Evans & Co.*
ATTORNEY

Dec. 28, 1937.  E. M. LEWIS  2,103,951
APPARATUS FOR MAKING BURIAL COFFINS
Filed March 2, 1936  3 Sheets-Sheet 2
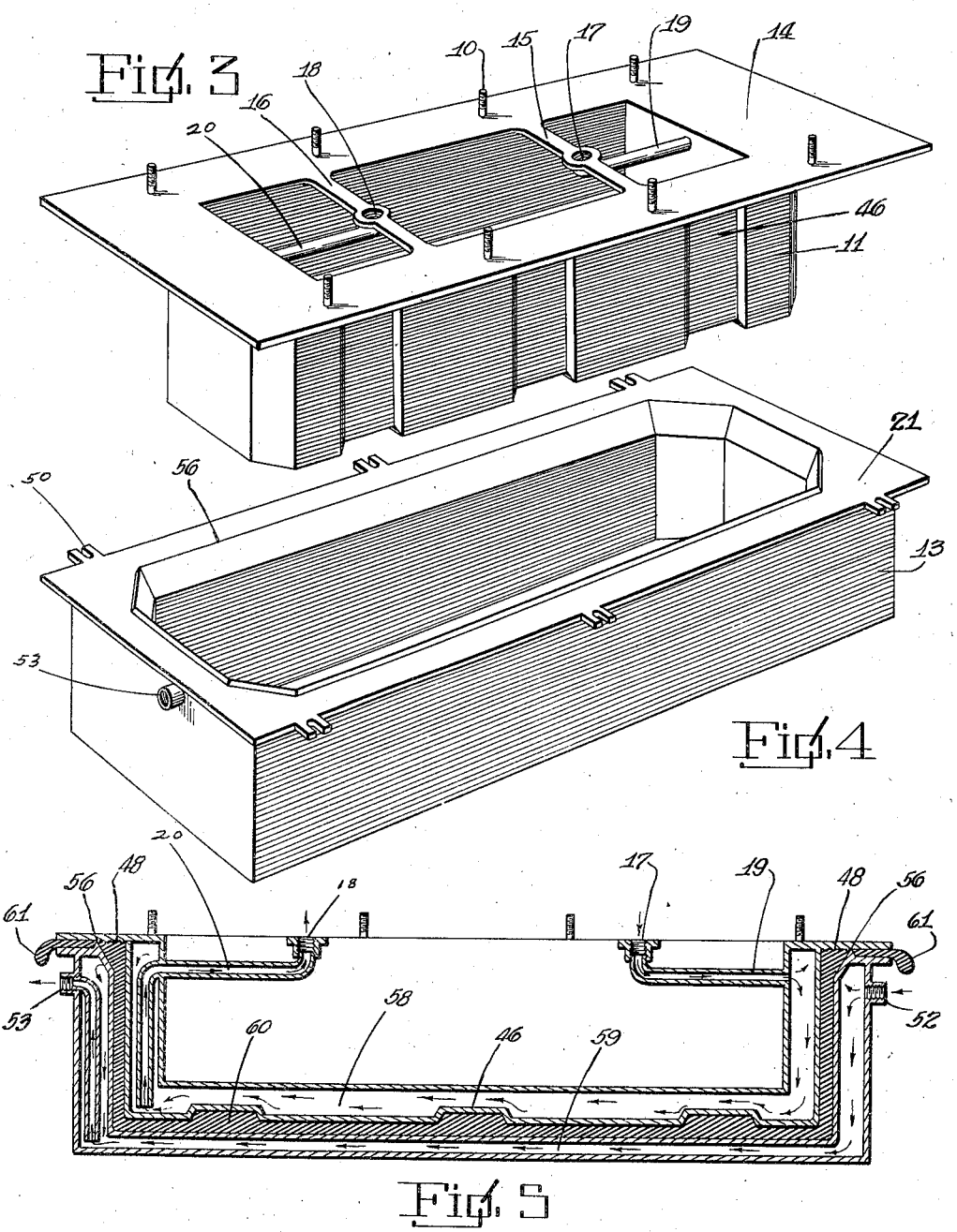
INVENTOR
Everett M. Lewis
BY
Victor J. Evans & Co.
ATTORNEY Dec. 28, 1937.　　　　E. M. LEWIS　　　　2,103,951
APPARATUS FOR MAKING BURIAL COFFINS
Filed March 2, 1936　　　3 Sheets-Sheet 3

INVENTOR
Everett M. Lewis
BY
Victor J. Evans & Co.
ATTORNEY

Patented Dec. 28, 1937

2,103,951

UNITED STATES PATENT OFFICE 2,103,951

APPARATUS FOR MAKING BURIAL COFFINS

Everett Marion Lewis, Tulsa, Okla.

Application March 2, 1936, Serial No. 66,694

3 Claims. (Cl. 18—55)

This invention relates to methods of making burial coffins from formative substances having chemically treated cellulose incorporated therein as a base and from other substances of a like nature, preferably a substance having an acid treated cellulose base such as cellulose nitrate, camphorated cellulose nitrate, pyroxylin, Xylonite, Celluloid, viscose, pegamoid and other substances of this class, and from a condensation product of phenols and formaldehyde as Bakelite and the like and from caoutchouc and the like.

This invention also relates to molds and apparatus made of metallic substances which are used in molding, modeling and making burial coffins from any of the substances heretofore stated.

Primarily, the object of the present invention might be generally stated as consisting in an effort to make burial coffins from substances having long resistance to the deleterious chemical constituents of the earth, thereby increasing their efficiency with reference to deterioration without appreciably affecting adversely their cost of production.

More specifically, one object of the present invention is to provide burial coffins of a material having long resistance to penetration or permeation by water and long resistance to penetration by air and of a material having long resistance to the deleterious chemical constituents of the earth and of a comparatively light weight material having marked resistance to breakage.

With the foregoing and other objects in view, the nature of which will become apparent as the description proceeds; the invention consists in the employment of one or more of the substances in making burial coffins as heretofore stated. In employing substances having chemically treated cellulose incorporated therein as pyroxylin, Xylonite, Celluloid, viscose, pegamoid and the like or in employing substances having some variation from the standard or usual formula for these substances I prefer incorporating therein a substance or substances which render the product less inflammable and as near as possible devoid of odor. In preparation of one substance for the purpose stated in which pyroxylin makes up the base I prefer the addition of Venice turpentine in combination with acetone, ether and methyl alcohol, a small amount of camphor may be added to the mixture; the product thus obtained is very similar in appearance and properties to that of Xylonite or Celluloid with the advantage of reduced cost of production and the product is odorless when camphor is not added.

Several other substances may be utilized in making a suitable preparation for use in making burial coffins, one of which is chemically treated casein in combination with camphorated cellulose nitrate. The pulp of this product when treated with formaldehyde to render insoluble the casein incorporated, presents in employment the general properties of ordinary Xylonite or Celluloid and offers the advantage of reduced cost of production. Albumin treated with formol (solution of formaldehyde in wood alcohol and water) may be utilized to a certain extent. Gelatin or strong glue of gelatin base may be mingled with Xylonite or Celluloid under suitable conditions and offers the advantage of reduced cost of production. Liquefied fish glue and gum arabic with colza oil mixed with Xylonite or Celluloid offers a product practically uninflammable. Silica either in the state of amylic, ethylic, or methylic silicate or in the state of any ether derivative of silicic acid may be incorporated with Xylonite or Celluloid to reduce inflammability of the product. An ether-alcohol solution of ferric perchloride added and mixed with an ether-alcohol solution of Xylonite or Celluloid and allowed a spontaneous evaporation process and washing and drying supplies a product practically uninflammable. In employing any of the substances stated in making burial coffins they are subjected to pressure in the molds hereinafter described and claimed. The said molds are used either hot or cold and are provided with a suitable arrangement for heating by steam.

In employing a condensation product of phenols and formaldehyde as Bakelite and the like for the purpose stated, such substances are subjected to heat and pressure in the steam heated mold hereinafter described and claimed. The object of this procedure is that of proper molding and modeling and the conversion of such substances into an infusible and insoluble form.

In employing caoutchouc and the like for the purpose stated, such substances are mixed with suitable materials as vulcanizing agents such as sulphur, sulphides and oxides and in some of such substances a filler is added. The substance is then subjected to heat and pressure in the steam heated molds hereinafter described and claimed; the object of this procedure is that of proper molding and vulcanizing. The substances employed in making burial coffins as heretofore stated are also utilized as a veneering over the body and lid of burial coffins which are made of various other substances such as wood, fiber, metal and the like by a dipping or veneering process, which in some instances offers the advantage of reduced cost of production. In employing any of the substances heretofore stated the degree of heat and the amount of pressure necessary for the best results depend on that required for the particular kind of substance employed.

Figure 2:
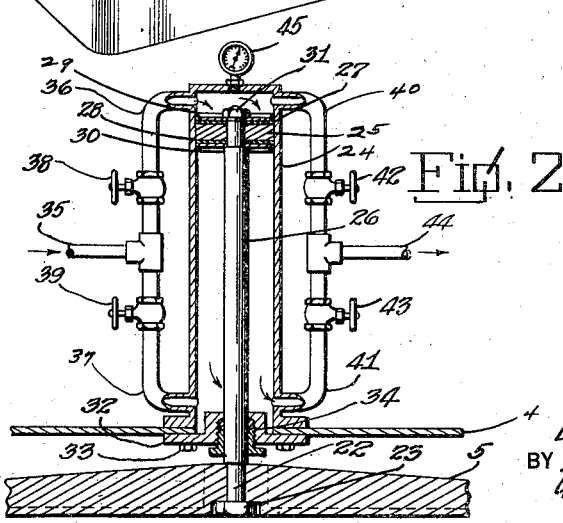
Figure 6:
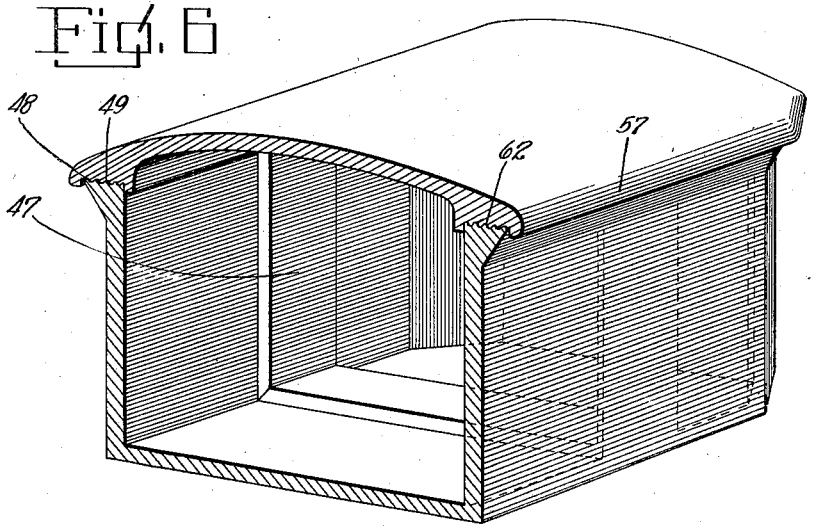
Figure 7:
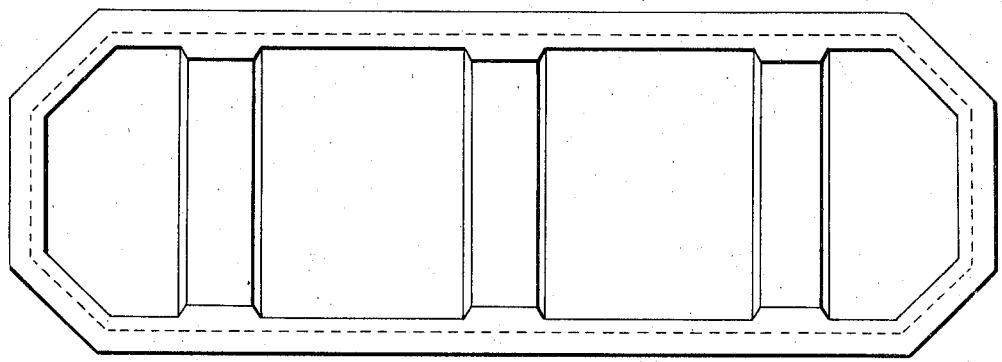

This invention also consists in metallic molds and metallic apparatus for molding, modeling and making burial coffins from any of the substances heretofore stated. The said molds and apparatus are hereinafter fully described and claimed and illustrated in the accompanying drawings wherein: Figure 1 is a more or less diagrammatic illustration of the molds and apparatus as it appears ready for use. Figure 2 is a vertical sectional view illustrating the dual or double acting engine or ram of my apparatus, a fragmentary longitudinal sectional view of the top supporting plate, and a fragmentary longitudinal sectional view of the male mold supporting and traveling plate. Figure 3 is an oblique view of the male mold. Figure 4 is an oblique view of the female mold. Figure 5 is a longitudinal cross section of both male and female molds with burial coffin material in place; with arrows designating circulating flow through both molds. Figure 6 is a perspective sectional view taken through a burial coffin and lid thereof, molded by my apparatus, and illustrates one of the reinforcement ribs and the corrugated connection between the lid and the angular flange on top of the burial coffin body. Figure 7 is a plan view of the complete lower portion of the burial coffin showing the reinforcement ribs with the outside vertical walls shown in dotted lines.

Referring to the drawings in detail, it will be noted from Figure 1 that the apparatus consists of a supporting base 1 which is constructed of heavy metal preferably of steel or iron. This supporting base is of oblong cabinet form and is composed of a bottom, two lateral and two end walls of single walled type of construction and attached on top of these four walls is an inwardly extending flange 2 which increases the strength of said base and provides ample supporting surface for female mold. Fixed to and rising from the top of flange 2 adjacent the corners thereof are four round posts 3, which serve as a support for top plate 4 and as guide posts for the ribbed traveling plate 5. The said top plate is attached on top of the said posts by bolts 6, this top plate serving as a support for the dual or double acting engine or ram 7 which is attached on top of this plate by bolts 33. The median portion of the top plate 4 is provided with an opening to accommodate the cylinder bottom plate 32 of the engine 7. Piston rod 26 of engine 7 has an extended portion 22, the end of which is threaded. In assembling, this extended portion is passed through an opening provided for it, in the median portion of traveling plate 5 where it is attached to this plate by nut 23; the said ribbed traveling plate is provided with four round openings one near each of its four corners; conforming with these four round openings and attached above them and to the said ribbed traveling plate are four round bands or cuffs 8. These four round bands or cuffs together with the four round openings through ribbed traveling plate 5 fit over round posts 3. In assembling, the top ends of the four round posts 3 are passed through their respective openings in ribbed traveling plate 5; top plate 4 is then bolted on top of each corner post by bolts 6 as heretofore stated. The purpose of the four round bands or cuffs on the ribbed traveling plate is that of minimizing any lateral or end play while it is in motion either in ascension or descension. The top of said traveling plate is provided with reinforcing ribs 9 for the purpose of greater strength in operation; the margin of this traveling plate is provided with holes to accommodate threaded stud bolts 10. Male mold 11 is provided with threaded stud bolts 10. In assembling, these threaded stud bolts are pushed through their respective openings in margin of ribbed traveling plate 5 and are held in position by nuts 12; this procedure bringing together ribbed traveling plate 5 and male mold 11 in position ready for use. Thus the said traveling plate serves as a support and guide for the said male mold in either ascension or descension. This supporting, actuating and guiding apparatus accommodates various sizes of the male and female molds for molding the body or lid of burial coffins; the larger molds having narrow outwardly extending flanges and the smaller molds having wide outwardly extending flanges. Thus various sizes of the male mold fit and are interchangeable on the ribbed traveling plate of this apparatus and various sizes of the female mold fit and are interchangeable on the supporting base of this apparatus.

The dual or double acting engine 7 serves as actuating means for male mold 11, and this engine is of metal construction except the piston cups which are made of leather, or other suitable composition material or metal; the said engine being composed of cylinder 24, piston 25, piston rod 26, piston cups 27—28, piston cup plates 29—30, piston retaining nut 31, cylinder bottom plate 32, which is properly gasketed, cylinder bottom plate retaining nut 33, stuffing box 34, feed pipe 35 and its extended double feed pipes 36—37, valves 38—39, exhaust pipes 40—41, valves 42—43, extended exhaust pipe 44 and pressure gauge 45. This engine may be operated by means of hydraulic, compressed air or steam pressure. In employing any of the aforesaid means for the operation of this engine the pressure enters cylinder through feed pipe 35 by way of one of its extensions 36 or 37 and exhausts by way of one of the exhaust pipes 40 or 41 and the extended exhaust pipe 44. In Figure 2, the piston 25 together with its piston rod 26 is illustrated in an ascended position. To produce descension of this piston, valves 39 and 42 are closed, valves 38 and 43 are open, the pressure means employed enters top of cylinder 24 through feed pipe 35 and its extension 36, from a source of supply and said piston together with its piston rod 26 is forced downward by this means the distance of its full travel course; the residual air in lower portion of cylinder 24 exhausting through exhaust pipe 41 and extended exhaust pipe 44 as piston 25 descends. To produce ascension of piston 25 together with its piston rod 26, valves 38 and 43 are closed, valves 39 and 42 are open, the pressure means employed enters bottom of cylinder 24 through feed pipe 35 and its extension 37 from a source of supply and said piston together with its piston rod 26 is forced upward by this means the distance of its full travel course, the residual air in upper portion of cylinder 24 exhausting through exhaust pipe 40 and extended exhaust pipe 44 as piston 25 ascends. When the dual or double acting engine 7, is in operation, it serves to actuate ribbed traveling plate 5 together with the attached male mold 11 either in ascension or descension. Pressure gauge 45 is for the purpose of determining the amount of pressure in top of cylinder 24. The male mold as shown in Figure 3 is of oblong shape, and is composed of a double bottom, double lateral and double end walls, between which there is a circulating cavity or chamber 58 at all points except at the top of said walls where the cavity is covered by outwardly extending flange 14, which is an outward extension of the internal walls and is brazed or otherwise attached on top of the external walls of this mold. Thus an inclosed circulating cavity is formed between the double bottom, double lateral and double end walls. This mold is provided with cross members 15 and 16, the median portion of which have threaded round openings 17 and 18 therein, and the threaded round opening 17 accommodates the threaded end portion of steam feed pipe 19 while the threaded round opening 18 accommodates the threaded end portion of steam exhaust pipe 20. Steam enters the intervening circulating cavity of this mold through flexible steam hose 63 and steam feed pipe 19 which is connected therewith by pipe union 65, the steam circulating through the said intervening cavity, supplying heat to this mold and finally exhausted through steam exhaust pipe 20 and flexible steam hose 64 which is connected therewith by pipe union 66. The outer walls and the outer bottom of this mold are provided with three or more depressions 46 which serve in forming reinforcement ribs 47 inside burial coffin body; and metal handholds, clasps or other such hardware are attached to the outside of burial coffin body over thickened portions created by these reinforcement ribs. The flat under surface of outwardly extending flange 14 is provided with corrugations of a sufficient number to form corrugations 48 on top of angular flange of burial coffin body. The under surface of outwardly extending flange 14 of the male mold for use in connection with the production of burial coffin lids and is provided with a corrugated welt of a sufficient thickness and width to produce depressed corrugated portion 49 in the flange of said lid.

The female mold 13, as best shown in Figure 4 is of oblong shape, and is composed of a double bottom, double lateral and double end walls, between which there is a circulating cavity or chamber 59 at all points except at the top of said walls where the cavity is covered by outwardly extending flange 21. This flange is an outward extension of the internal walls and is brazed or otherwise attached on top of the external walls of this mold, thus an inclosed circulating cavity is formed between the double bottom, double lateral and double end walls. The marginal portion of this outwardly extending flange is provided with six or more slotted lugs 50 which extend horizontally for a short distance therefrom. The lugs serve to receive the shanks of clasp fasteners 51, which are pivotally attached to base support 1, and when engaged in the slotted lugs 50 and held by the thumb nuts thereof, serve to retain female mold in steady position on base support 1 while the mold is in use. At the ends of this mold and located near its top are outwardly extending cylindrical nipples 52 and 53 which are provided with threads internally. The nipple 52 accommodates the threaded end portion of steam feed pipe 54, while the nipple 53 accommodates the threaded end portion of steam exhaust pipe 55. Steam enters the intervening circulating cavity of this mold through steam feed pipe 54, and circulates through said cavity supplying heat to this mold and is finally exhausted through steam exhaust pipe 55. Both the male and female molds are made of noncorrosive metal such as stainless steel. The intervening circulating cavity in these molds is ample for a sufficient amount of steam to enter, circulate and heat the said molds and thereby heat the substance employed in making burial coffins and lids to a desirable degree of temperature for good results in molding and when required a sufficient degree of temperature can be produced to vulcanize the said substance. In making burial coffins exclusive of the necessary metal handholds, clasps or other such hardware, I employ one or more of the substances heretofore stated by subjecting the same to heat and pressure in the steam heated molds or by subjecting the said substance or substances to pressure in these molds without heating the said molds. A sufficient amount of the substance or substances employed for the purpose stated is placed in the vat of the female mold where it is heated to a desirable degree of temperature. The male mold is then lowered by action of the dual or double acting engine 7 until it contacts the substance employed. Pressure is then applied to this substance by further lowering male mold 11 by action of the engine 7 and the said substance is pressed until it fills the space between the vat of the female mold and the surface of the male mold; and when the male mold has descended into the vat of the female mold its full travel course and rests on seating flange 56 of the female mold, the body or the lid of the burial coffin is molded in one piece; the thickness of which equals the distance between the vat in the female mold and the surface of the male mold. The lid of the burial coffin is made by the same method as that employed in making the body, and the molds are of the same size, except that the top of the vat in the female mold for making the lid is slightly wider, this increased width forms the outside rim 57 of the lid. Both the male and female molds for use in making the lid are shallower than the molds used in making the body of the burial coffin as will be apparent.

Figure 5 illustrates the male mold at the end of its full travel course with its outwardly extending flange 14 resting on the seating rib 56 of the female mold with the substance 60 employed pressed between the male and female molds, and when the molds are in this position the seating rib 56 cuts off overflow 61 of the substance.

Any suitable means may be employed for securing the lid to the coffin body and I preferably provide ratchet bars not shown, which are attached near the top of reinforcement ribs 47 inside of the burial coffin body and pawls cooperating therewith are attached to the lower portion of the rim inside of the burial coffin lid, while strips of metal foil, such as lead or tin are fitted in corrugated slots 62, to act as sealing means.

What I claim is:

1. A molding apparatus for burial coffins and lids therefor, comprising a base, guide means rising from the base, a plate mounted for travel on the guide means, a male mold including spaced walls providing a chamber therein, a flange disposed about and outwardly beyond the top of the mold and closing the chamber, means for detachably securing the flange to the traveling plate for movement of the mold therewith, a female mold receiving the male mold for cooperation therewith and including spaced walls providing a chamber therein, a flange disposed about and outwardly beyond the top of the female mold for closing the chamber thereof to rest upon the base, slotted means extending from the outer edges of the flange of the female mold, means pivotally mounted to the base and received in the slots for detachably securing the female mold to the base, ram means for the traveling plate to raise and lower the male mold with respect to the female mold, means for introducing steam in the chambers, and exhaust means therefor.

2. A molding apparatus for burial coffins and lids therefor, comprising a base, guide means rising from the base, a plate mounted for travel on the guide means, a male mold including spaced walls providing a chamber therein, a flange disposed about and outwardly beyond the top of the mold and closing the chamber, steam inlet and outlet means for the chamber and including pipes extending from the inner wall thereof, means bridging the flange and supporting the pipes, means for detachably securing the flange to the traveling plate for movement of the mold therewith, a female mold receiving the male mold for cooperation therewith and including spaced walls providing a chamber therein, a flange disposed about and outwardly beyond the top of the female mold for closing the chamber thereof and to rest upon the base, steam inlet and outlet means for the last mentioned chamber and extending through the base, means for detachably securing the female mold to the base, means for the traveling plate to raise and lower the male mold with respect to the female mold and means for spacing the flanges with respect to each other and to cut off the flow of molding material from between the same.

3. A molding apparatus for burial coffins, comprising a hollow base, guide means rising from the base, a plate having reinforcing ribs on the upper surface thereof and mounted for travel on the guide means, a male mold including spaced walls providing a chamber therein and having depressions in the sides and bottom thereof to provide reinforcing means on the body of the molded coffin, a flange disposed about and outwardly beyond the top of the mold and closing the chamber, means for detachably securing the flange to the under surface of the traveling plate for movement of the mold therewith, a female mold receiving the male mold for cooperation therewith and including spaced walls providing a chamber therein, a flange disposed about and outwardly beyond the top of the female mold for closing the chamber thereof and to rest upon the base, slotted lugs extending outwardly from the last mentioned flange, means including threaded shanks pivotally secured to the base and receivable in the slots, means on the shanks for binding association with the lugs to cooperate therewith for detachably securing the female mold within the base, ram means for the traveling plate to raise and lower the male mold with respect to the female mold, and means for introducing heat in the chambers.

EVERETT MARION LEWIS.